(12) United States Patent
Baer

(10) Patent No.: US 11,294,530 B2
(45) Date of Patent: Apr. 5, 2022

(54) DISPLAYING A TRANSLUCENT VERSION OF A USER INTERFACE ELEMENT

(71) Applicant: Microsoft Technology Licensing, LLC, Redmond, WA (US)

(72) Inventor: Matthias Baer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

(21) Appl. No.: 15/796,727

(22) Filed: Oct. 27, 2017

(65) Prior Publication Data
US 2019/0042059 A1 Feb. 7, 2019

Related U.S. Application Data

(60) Provisional application No. 62/542,265, filed on Aug. 7, 2017.

(51) Int. Cl.
*G06F 3/0481* (2013.01)

(52) U.S. Cl.
CPC .. *G06F 3/0481* (2013.01); *G06F 2203/04803* (2013.01); *G06F 2203/04804* (2013.01)

(58) Field of Classification Search
CPC ......... G06F 3/0481; G06F 2203/04803; G06F 2203/04804
See application file for complete search history.

(56) References Cited

U.S. PATENT DOCUMENTS

| | | | | |
|---|---|---|---|---|
| 4,555,775 A | * | 11/1985 | Pike | G09G 5/14 715/790 |
| 4,890,257 A | * | 12/1989 | Anthias | G09G 5/14 715/807 |
| 5,075,675 A | * | 12/1991 | Barker | G06F 3/0481 715/794 |
| 5,764,229 A | * | 6/1998 | Bennett | G06F 3/0481 715/797 |
| 5,838,334 A | * | 11/1998 | Dye | G06F 12/08 345/503 |
| 5,859,640 A | * | 1/1999 | de Judicibus | G06F 3/0481 715/710 |

(Continued)

FOREIGN PATENT DOCUMENTS

| CA | 2519753 A1 | 3/2006 |
|---|---|---|
| CN | 102929478 A | 2/2013 |

OTHER PUBLICATIONS

Geymayer, et al., "Show Me the Invisible Visualizing Hidden Content", In Proceedings of the SIGCHI Conference on Human Factors in Computing Systems, Apr. 26, 2014, pp. 3705-3714.

(Continued)

*Primary Examiner* — Jung-Mu T Chuang

(57) ABSTRACT

Electronic devices described herein are configured to display updated content associated with a first application having a first user interface element disposed in a background area of a display that is obscured by a second user interface element associated with a second application. Responsive to a command from the first application to notify the user of the updated content, the operating system displays at least a portion of a translucent version of the first user interface element with the updated content in the foreground display area, wherein the translucent version of the first user interface element obscures at least a portion of the second user interface element.

20 Claims, 12 Drawing Sheets

(56) References Cited

U.S. PATENT DOCUMENTS

| | | | | |
|---|---|---|---|---|
| 5,896,131 A * | 4/1999 | Alexander | G09G 5/395 | 345/440 |
| 5,949,432 A * | 9/1999 | Gough | G06F 3/0481 | 345/629 |
| 6,005,575 A * | 12/1999 | Colleran | G06F 9/451 | 715/807 |
| 6,011,537 A * | 1/2000 | Slotznick | G06F 3/14 | 715/733 |
| 6,252,595 B1 * | 6/2001 | Birmingham | G06F 3/0481 | 715/803 |
| 6,633,310 B1 * | 10/2003 | Andrew | G06F 3/0481 | 715/728 |
| 6,760,784 B1 * | 7/2004 | Bodin | G06F 9/4411 | 345/593 |
| 6,829,015 B2 * | 12/2004 | Kwon | H04N 5/44504 | 348/569 |
| 7,269,832 B2 * | 9/2007 | Bodin | G06F 9/4411 | 719/321 |
| 7,577,918 B2 * | 8/2009 | Lindsay | G06F 3/0481 | 715/716 |
| 7,681,143 B2 * | 3/2010 | Lindsay | G06F 3/0481 | 715/788 |
| 7,839,419 B2 * | 11/2010 | Hanggie | G06F 3/0481 | 345/619 |
| 8,059,137 B2 * | 11/2011 | Hanggie | G06F 3/0481 | 345/619 |
| 8,191,003 B2 * | 5/2012 | Brown | G06F 3/0486 | 715/769 |
| 8,533,624 B2 * | 9/2013 | Chaudhri | G06F 3/0481 | 715/781 |
| 8,539,345 B2 * | 9/2013 | Appleyard | G06F 16/954 | 715/255 |
| 8,539,503 B2 * | 9/2013 | Homma | H04N 19/159 | 709/219 |
| 8,825,814 B1 * | 9/2014 | Efrati | H04L 67/10 | 370/352 |
| 8,909,202 B2 * | 12/2014 | Luna | H04L 67/22 | 455/414.1 |
| 9,268,466 B2 * | 2/2016 | Momchilov | G06F 3/0484 | |
| 9,336,068 B2 * | 5/2016 | Parker | G06F 9/542 | |
| 9,336,070 B1 * | 5/2016 | Parker | G06F 9/542 | |
| 9,462,965 B2 * | 10/2016 | Stanley-Marbell | G06F 8/65 | |
| 9,584,814 B2 * | 2/2017 | Socek | G06T 7/11 | |
| 9,619,912 B2 * | 4/2017 | Bhatnagar | G06T 13/00 | |
| 9,703,392 B2 * | 7/2017 | Wakabayashi | G06F 3/0237 | |
| 9,798,579 B2 * | 10/2017 | Park | G06F 9/4843 | |
| 9,830,167 B2 * | 11/2017 | Taylor | G06F 8/65 | |
| 9,880,735 B2 * | 1/2018 | Dascola | H04M 1/72522 | |
| 10,116,601 B2 * | 10/2018 | Sirpal | H04L 51/046 | |
| 10,200,824 B2 * | 2/2019 | Gross | G06F 3/0488 | |
| 10,205,913 B2 * | 2/2019 | Smith | H04N 5/23206 | |
| 10,238,867 B2 * | 3/2019 | Ryaby | A61N 1/36003 | |
| 10,387,104 B2 * | 8/2019 | Decker | G06F 3/04842 | |
| 2002/0145611 A1 * | 10/2002 | Dye | G09G 5/14 | 345/543 |
| 2003/0090521 A1 * | 5/2003 | Hansen | G06F 3/03543 | 715/767 |
| 2003/0095135 A1 * | 5/2003 | Kaasila | G06F 3/0481 | 345/613 |
| 2004/0210911 A1 * | 10/2004 | Bodin | G06F 9/4411 | 719/321 |
| 2006/0059432 A1 * | 3/2006 | Bells | G06F 3/0481 | 715/768 |
| 2006/0061597 A1 * | 3/2006 | Hui | G06F 3/0481 | 345/629 |
| 2007/0005926 A1 * | 1/2007 | Kim | G06F 12/023 | 711/170 |
| 2008/0040672 A1 * | 2/2008 | Appleyard | G06F 16/954 | 715/742 |
| 2008/0059904 A1 * | 3/2008 | Abbey | G06F 9/451 | 715/802 |
| 2008/0143739 A1 * | 6/2008 | Harris | G09G 5/02 | 345/604 |
| 2009/0007012 A1 * | 1/2009 | Mandic | G06F 3/0481 | 715/810 |
| 2010/0171748 A1 * | 7/2010 | Shepard | G06F 3/14 | 345/541 |
| 2011/0138295 A1 * | 6/2011 | Momchilov | G06F 3/0484 | 715/740 |
| 2011/0185287 A1 * | 7/2011 | Dharmarajan | G06F 16/9574 | 715/752 |
| 2012/0174008 A1 * | 7/2012 | Wakabayashi | G06F 3/0237 | 715/768 |
| 2012/0216146 A1 * | 8/2012 | Korkonen | G06F 3/0482 | 715/835 |
| 2012/0260217 A1 * | 10/2012 | Celebisoy | G06F 3/0488 | 715/836 |
| 2013/0067035 A1 * | 3/2013 | Amanat | H04N 21/6543 | 709/219 |
| 2013/0178195 A1 * | 7/2013 | Luna | H04W 28/06 | 455/414.1 |
| 2013/0286018 A1 * | 10/2013 | Freyhult | G09G 5/393 | 345/428 |
| 2014/0007013 A1 * | 1/2014 | Yun | G06F 3/04817 | 715/835 |
| 2014/0351729 A1 * | 11/2014 | Park | G06F 9/451 | 715/767 |
| 2014/0366040 A1 * | 12/2014 | Parker | G06F 9/542 | 719/318 |
| 2015/0121301 A1 * | 4/2015 | Wang | G06F 3/0481 | 715/790 |
| 2015/0334398 A1 * | 11/2015 | Socek | G06T 7/11 | 375/240.26 |
| 2015/0347204 A1 * | 12/2015 | Stanley-Marbell | G06F 9/4893 | 719/318 |
| 2015/0378572 A1 * | 12/2015 | Brown | G06F 3/0486 | 715/768 |
| 2016/0048398 A1 * | 2/2016 | Taylor | G06F 9/451 | 717/168 |
| 2016/0073029 A1 * | 3/2016 | Markovitz | H04N 5/2621 | 348/333.01 |
| 2016/0105644 A1 * | 4/2016 | Smith | H04N 5/23206 | 348/159 |
| 2016/0231902 A1 * | 8/2016 | Sirpal | H04L 51/046 | |
| 2016/0360382 A1 * | 12/2016 | Gross | G06F 3/0488 | |
| 2017/0046024 A1 * | 2/2017 | Dascola | H04M 1/72522 | |
| 2017/0083166 A1 * | 3/2017 | Chen | G06F 3/0481 | |
| 2017/0235905 A1 * | 8/2017 | Santiago, Jr. | G06F 19/3418 | 705/2 |
| 2018/0104484 A1 * | 4/2018 | Ryaby | A61N 1/08 | |
| 2019/0138740 A1 * | 5/2019 | Ricknas | G06F 21/62 | |

OTHER PUBLICATIONS

Hari, Piyush, "Android Tapping a notification does not bring application from background to foreground", https://github.com/phonegap-build/PushPlugin/issues/35, Published on: Jul. 18, 2013, 24 pages.

"Blur or dim background when Android PopupWindow active", http://stackoverflow.com/questions/3221488/blur-or-dim-background-when-android-popupwindow-active%20http:/stackoverflow.com/questions/3221488/blur-or-dim-background-when-android-popupwindow-active, Published on: Mar. 12, 2012, 5 pages.

* cited by examiner

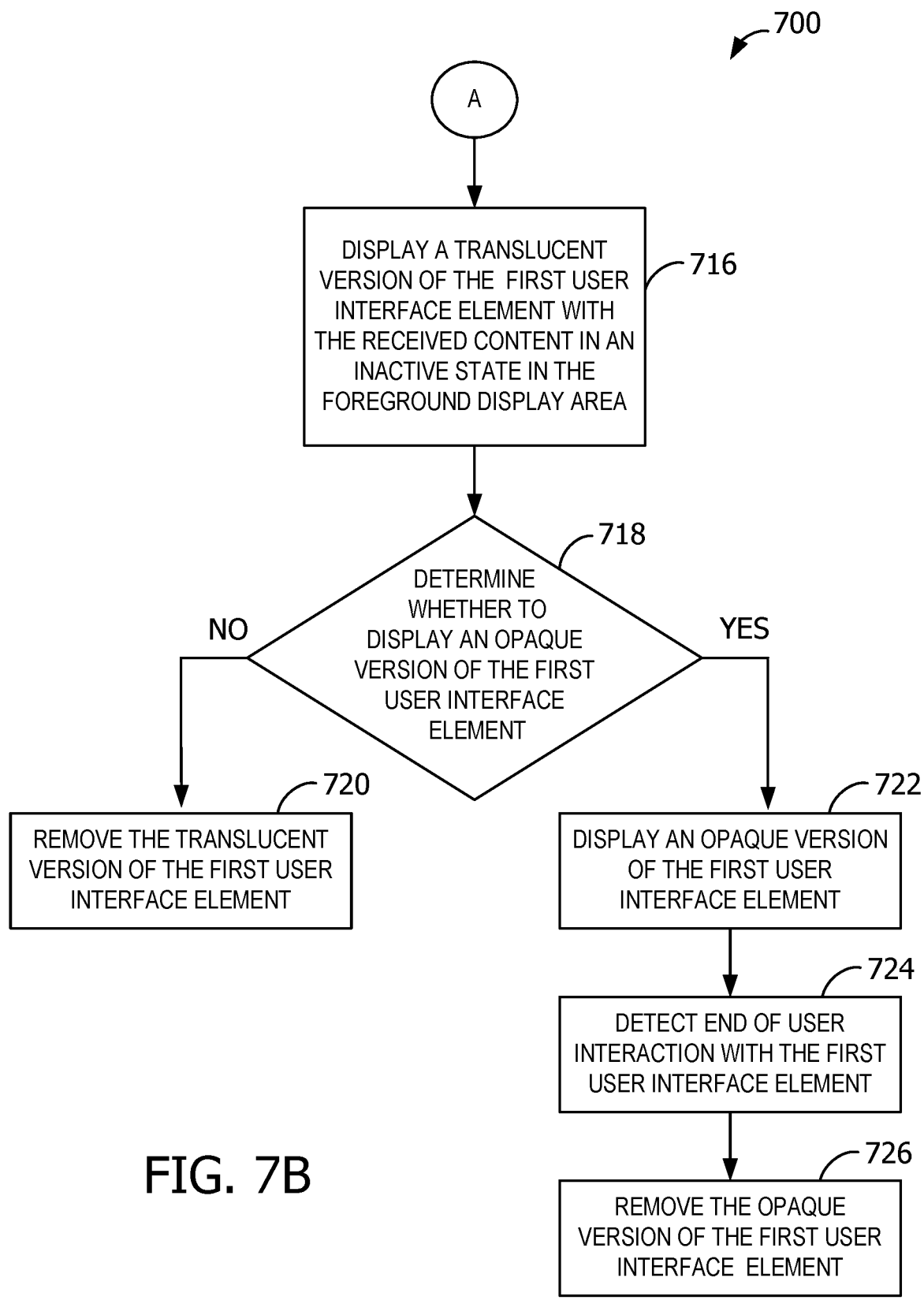

DISPLAYING A TRANSLUCENT VERSION OF A USER INTERFACE ELEMENT

CROSS-REFERENCE TO RELATED APPLICATION

This application claims priority from U.S. Provisional Patent Application No. 62/542,265, filed Aug. 7, 2017, the entirety of which is hereby incorporated by reference herein.

BACKGROUND

Many types of electronic devices often have multiple applications executing on a single device at the same time. Examples of such electronic devices include, but are not limited to, desktop computers, laptops, tablets, and mobile phones.

A user may interact with a first application via a first user interface element and decide to open a second user interface element associated with a second application on an electronic device. In such cases, the second user interface element often obscures the first user interface element disposed in the background area of the display. When content, such as for example updated content, is received at the first application, a toast notification is typically displayed at the electronic device to inform the user that updated content has been received by the first application. The toast notification format is specific to the toast application and has the same format regardless of the application associated with the notification. The user typically taps on the toast notification to display the first user interface element including the updated content in the foreground area of the display. The user may have to scan the display to identify and view the updated content associated with the application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method comprises receiving content for display via a first user interface element at a display unit; detecting a second user interface element in a first display area on the display unit; and issuing a command to display a translucent version of at least a portion of the first user interface element including the received content in a foreground display area of the display unit, wherein the translucent version of the at least a portion of the first user interface element obscures at least a portion of the second user interface element.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

FIG. 3 illustrates a display of an example of second user interface element associated with a second application;

FIG. 5 illustrates a display of an example of an opaque version of the first user interface element overlaying the second user interface element;

FIGS. 7A-7B illustrates a flow chart representation of an exemplary method of displaying a first user interface element overlaying a second user interface element;

In FIGS. 1-11, the systems are illustrated as schematic drawings. The drawings may not be to scale. Corresponding reference characters indicate corresponding parts throughout the drawings.

DETAILED DESCRIPTION

Figure 1:
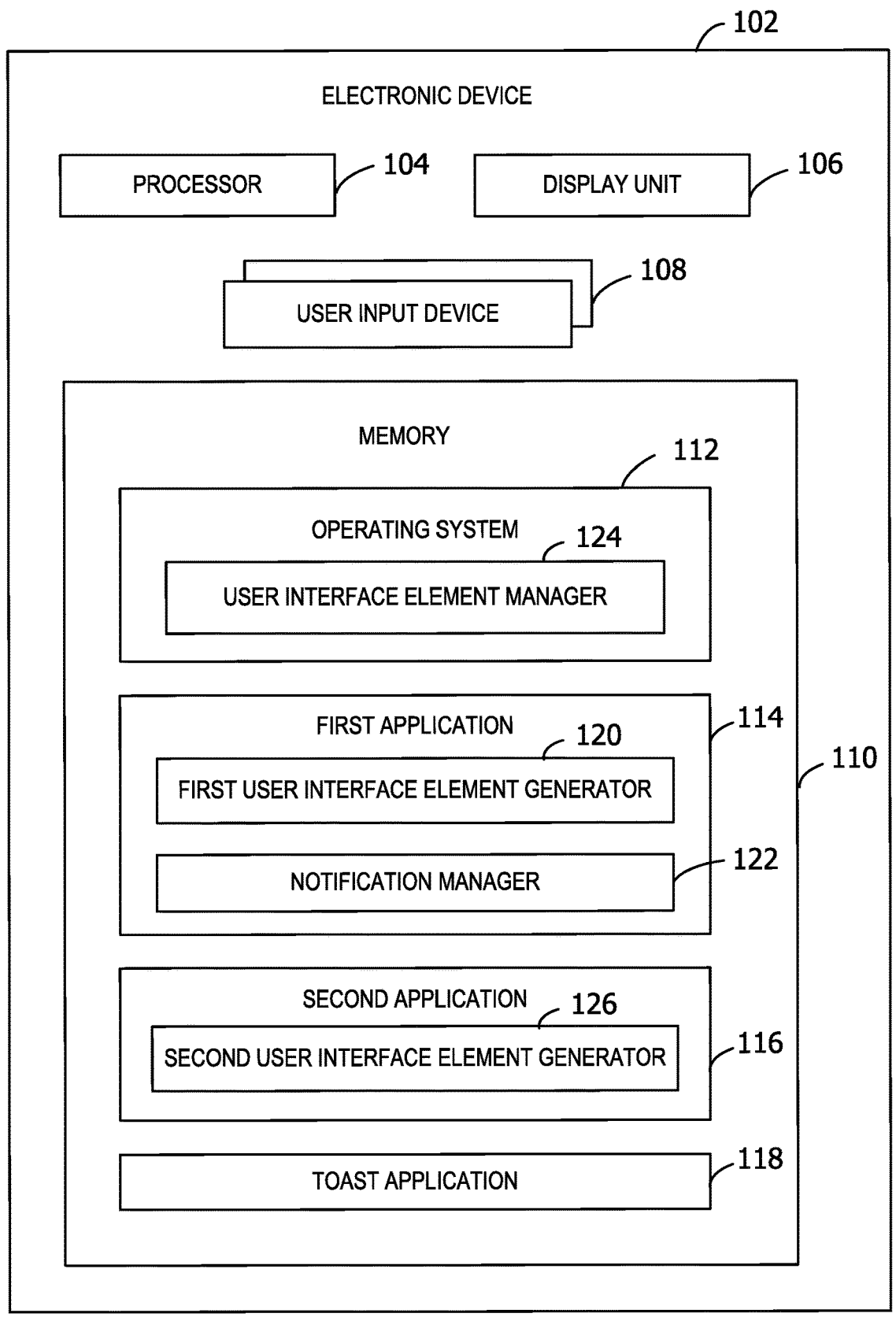
FIG. 1 illustrates a block diagram representation of an embodiment of the electronic device.

The electronic devices described herein are configured to enhance the experience of a user of an electronic device. Many types of electronic devices often have multiple applications executing on a single electronic device at the same time. A user may interact with a first application via a first user interface element and decide to open a second user interface element associated with a second application on the same electronic device. In such cases, the second user interface element is displayed in a foreground display area of a display unit of the electronic device and fully or partially obscures the first user interface element disposed in a background display area of the display unit.

When the first application receives updated content available for display via the first user interface element, the first application issues a command to notify the user that updated content has been received at the first application. An example of updated content may be a reply to a text message received at a text message application. In accordance with the disclosure, responsive to the command to notify the user of the updated content, the operating system detects that the second user interface element is displayed in the foreground display area and issues a command to temporarily display a translucent version of at least a portion of the first user interface element including the updated content in the foreground display area. The translucent version of the first user interface element obscures at least a portion of the second user interface element.

In this manner, the disclosure enables a user to peek or preview updated content associated with a window in a background display area. Only the updated content may be displayed (e.g., the newly-received message), or the entire window with all its content including the updated content.

When displaying only the updated content and/or areas near the updated content, the updated content may represent a difference between a version of the window prior to receiving the updated content, and a version of the window including the updated content. In this example, the difference in content appears at the same location in the window as if the entire window was brought to the foreground for display.

The updated content is translucent or transparent, and may shine through a window in a foreground display area or be overlaid on top of the window in the foreground display area. The use of an application associated with the window in the foreground display area is uninterrupted during display of the updated content; that is, a user can still type or click into the window in the foreground display area while previewing the updated content associated with the application in the background display area. Further, the user is able to issue a command to bring the application in the background display area to the foreground display area (e.g., become the active window).

The user can set application preferences indicating how certain notifications are to be handled by that application. For example, if the background application is a messaging application, the user can specify that messages from certain senders (e.g., family or work) may be displayed in the manner described herein, while messages from other senders are not displayed at all until the user views the messages by clicking on the application.

The detailed description provided below in connection with the appended drawings is intended as a description of a number of embodiments and is not intended to represent the only forms in which the embodiments may be constructed, implemented, or utilized. For example, various embodiments of the display of the translucent version of the first user interface element are described herein. Aspects of the disclosure are not limited to the individual embodiments, but are operable with any combination thereof, as well as other embodiments not specifically described but within the scope of the disclosure.

Referring to FIG. 1, a block diagram representation of an embodiment of an electronic device 102 is shown. Example of the electronic device 102 include, but are not limited to, PCs, servers, laptop computers, mobile telephones (including smart phones), tablet computers, media players, games consoles, personal digital assistants, virtual reality systems, augmented reality systems, and other devices with processing capability for executing instructions. The electronic device 102 includes a processor 104 communicatively coupled to a display unit 106, one or more user input devices 108 and a memory 110. The memory 110 stores an operating system 112, a first application 114, and a second application 116. The memory 110 may also store a toast application 118. The memory 110 and the computer program code are configured to, with the processor 104, to cause the electronic device 102 to perform a number of different functions as described herein. The electronic device 102 may include additional applications stored in the memory 110.

The first application 114 includes a first user interface element generator 120 and a notification manager 122. The first user interface element generator 120 generates a first user interface element that enables user interaction using a user input device 108 with the first application 114 via the first user interface element. The first user interface element generator 120 generates the first user interface element in a first application specific format. The notification manager 122 issues a command to provide notification to a user at the electronic device 102 when content is received at the first application 114 that warrants the issuance of a notification message to a user. In an embodiment, the content received by the first application 114 is updated content.

In an embodiment, the notification manager 122 transmits the command to provide the notification to the toast application 118 and to the operating system 112. In alternative embodiment, the notification manager 122 transmits the command to provide the notification to the toast application 118 and the operating system intercepts the command. In another embodiment, the notification manager 122 transmits the command to provide the notification to just the operating system 112. In an embodiment, the notification manager 122 transmits the content received by the first application and the first application specific format associated with the first user interface element to the operating system 112.

Examples of the first application 114 include, but are not limited to, an instant messaging application, a chat messaging application, a text messaging application, an email messaging application, a video communication application, a social media based communication application, a web site based communication application, a collaboration based communication application, a photo sharing application, a calendar appointment based communication application, a weather alert application, a virtual assistant communication application, and an intelligent assistant communication application. While the electronic device 102 is shown at having one first application 114, the electronic device 102 may include an additional number of first applications including one or more of the types of first applications listed above.

The second application 116 includes a second user interface element generator 126. The second user interface element generator 126 generates a second user interface element that enables user interaction using a user input device 108 with the second application 116 via the second user interface element. The second user interface generator 126 generates the second user interface element in a second application specific format. Examples of second applications include, but are not limited to, a word processing application, a spreadsheet application, and a drawing application. While the electronic device 102 is shown as including a single second application 116, the electronic device 102 may include multiple different types of second applications.

The operating system 112 includes a user interface element manager 124. The user interface element manager 124 detects when the notification manager 122 of the first application 114 issues a command to provide notification to a user at the electronic device 102 regarding content received at the first application 114. The user interface element manager 124 manages the display of content received by the first application 114.

In an embodiment, the user interface element manager 124 receives the command to provide the notification from the notification manager 122 of the first application 114. In alternative embodiment, the user interface element manager 124 intercepts the command to provide the notification during the transmission of the command to provide the notification from the notification manager 122 to the toast application 118. In an embodiment, the user interface element manager 124 receives the content received by the first application and the first application specific format associated with the first user interface element from the notification manager 122 of the first application 114. In another embodiment without the notification manager 122, the user interface element manager 124 detects when the first application receives the content. In an embodiment, the received content is updated content.

The user interface element manager 124 determines whether a second user interface element is on display in a foreground display area at the display unit 106. If the user interface element manager 124 determines that a second user interface element is on display in the foreground display area, the user interface element manager 124 displays a translucent version of the first user interface element with the content received by the first application 114 in the first application specific format. The translucent version of the first user interface element is displayed so that it overlays at least a portion of the display of the second user interface element (e.g., when the second user interface element is in front of the first user interface element).

In an embodiment, the user interface element manager 124 determines whether the second application has a higher display priority than the first application. If the second application has a higher display priority than the first application, the user interface element manager 124 inhibits the display of the translucent version of the first user interface element at the display unit 106. The display priority in some examples may be automatically set based on prior interaction by the user with the first and second applications (e.g., if more time spent with one application, that application takes priority). In an embodiment, user interface manager 124 delays the display of the translucent version of the first user interface element associated with the first application following the completion of the relatively higher priority tasks associated with the second application. In another embodiment, the user interface element manager 124 stores the notification associated with the content received by the first application for later review by the user.

User input (e.g., mouse click or text input) may be received via a user input device 108 in response to the displayed translucent version of the first user interface element. In response, the user interface element manager 124 of the operating system 112 determines whether to remove the translucent version of the first user interface element, or to replace the translucent version of the first user interface element with relatively less translucent version of the first user interface element. In an embodiment, the relatively less translucent version of the first user interface element is an opaque version of the first user interface element. The display of the translucent version of the first user element is a temporary display.

If the user interface element manager 124 replaces the translucent version of the first user interface element with the relatively less translucent version of the first user interface element, the user interface element manager 124 determines when to remove the relatively less translucent version of the user interface element from the foreground display area based on user input received via a user input device 108. In another embodiment, the user interface element manager 124 replaces the translucent version of the first user interface element with a complete display of the application associated with the translucent version of the first user interface element to the foreground display area based on user input received via a user input device 108.

While the user interface element manager 124 has been described as a component of the operating system 112, the user interface element manager 124 may be an independent application stored on the memory 110 of the electronic device 102.

Figure 2:
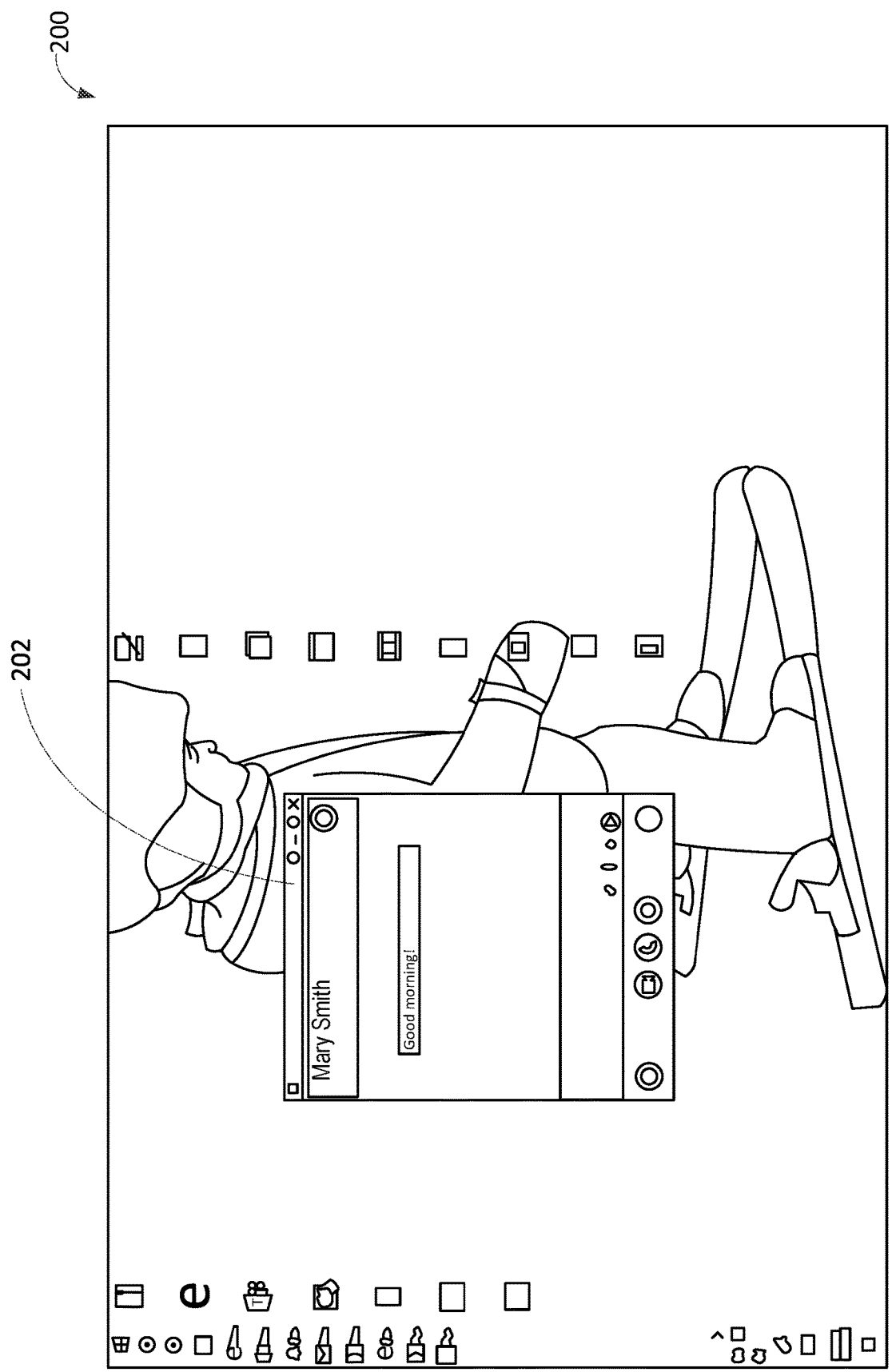
FIG. 2 illustrates a display of a desktop view including an example of a first user interface element associated with a first application.

Referring to FIG. 2, a display 200 of a desktop view including an example of a first user interface element 202 associated with a first application is shown. The first user interface element 202 is generated by the first user interface element generator 120 of the first application 114 is shown. The processor 104 is executing the computer readable code associated with the first application 114 on the electronic device 102. The first user interface element 202 has a first application specific format defined by the first user interface element generator 120 of the first application 114.

The first user interface element 202 can be placed in one of an active state (e.g., in the foreground) and an inactive state (e.g., in the background). When the first user interface element 202 is placed in an active state, a user may interact with the first application 114 using the first user interface element 202 displayed on the display unit 106 via a user input device 108. When the first user interface element 202 is placed in an inactive state, the first user interface element 202 is displayed on the display unit 106 but is not enabled to allow the entry of data associated with the first application 114 via the first user interface element 202. The first user interface element 202 is disposed at a display location on the display unit 106 and is in an active state in the display 200.

Figure 3:
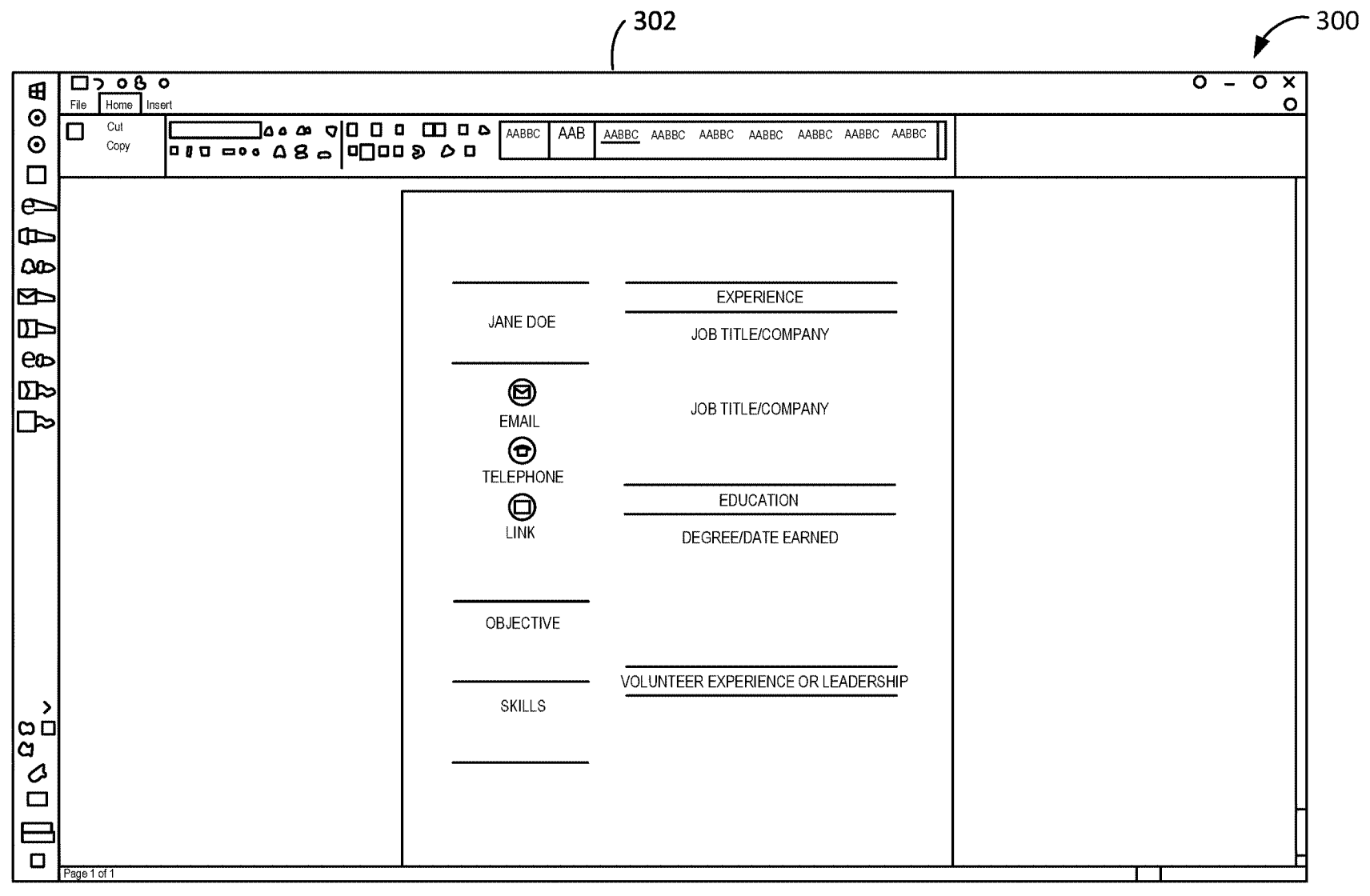

Referring to FIG. 3, a display 300 of an example of second user interface element 302 associated with a second application 116 is shown. The second user interface element 302 is generated by the second user interface element generator 126 of the second application 116. The processor 104 is executing the computer readable code associated with both the first application 114 and the second application 116 on the electronic device 102. The second user interface element 302 has a second application specific format defined by the second user interface element generator 126 of the second application 116.

The second user interface element 302 can be placed in one of an active state and an inactive state. When the second user interface element 302 is placed in an active state, a user may interact with the second application 116 using the second user interface element 302 displayed on the display unit 106 via a user input device 108. When the second user interface element 302 is placed in an inactive state, the second user interface element 302 is displayed on the display unit 106 but is not enabled to allow the entry of data associated with the second application 116 via the second user interface element 302.

In the display 300, the second user interface element 302 is displayed in a foreground display area of the display unit 106. In an embodiment, the first user interface element 202 remains in a background display area of the display unit 106. The second user interface element 302 overlays the first user interface element 202 obscuring the view of the first user interface element 202. While the second user interface element 302 is illustrated as overlaying the entire display of the first user interface element 202, the second user interface element 302 may overlay a portion of the first user interface element 202. In the display 300, the second user interface element 302 is in an active state and the obscured first user interface element 202 is in an inactive state.

In an alternative embodiment, the second user interface element 302 is displayed on the display unit 106 in an active state. The processor 104 is executing the computer readable code associated with both the first application 114 and the second application 116 on the electronic device 102. However, the user has not requested the display of the first user element interface 202 prior to requesting the display of the second user interface element 302. In other words, the second user interface element 302 is the only user interface element displayed on the display unit 106.

Figure 4:
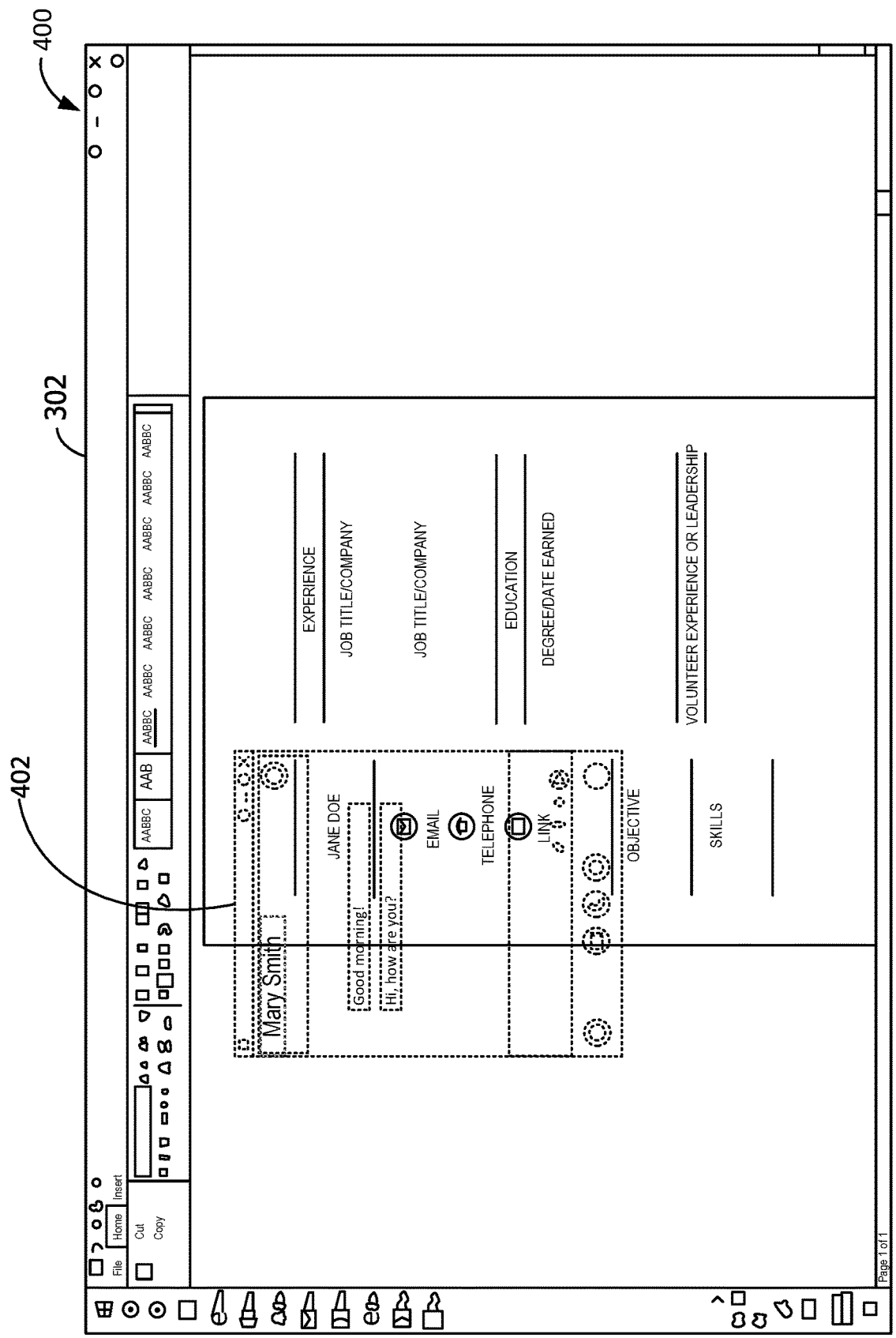
FIG. 4 illustrates a display of an example of a translucent version of the first user interface element overlaying the second user interface element.

Referring to FIG. 4, a display 400 of an example of a translucent version of the first user interface element 402 overlaying the second user interface element 302 is shown. The processor 104 is executing the computer readable code associated with both the first application 114 and the second application 116 on the electronic device 102. When first user interface element manager 124 receives the command to provide notification that the first application 114 has received content that is available for display, the user interface element manager 124 of the operating system 112 determines whether a second user interface element 302 is on display in a foreground display area of the display unit 106. If the user interface element manager 124 determines that a second user interface element 302 is on display in the foreground display area, the user interface element manager 124 coordinates the display of the translucent version of the first user interface element 402.

The translucent version of the first user interface element 402 is displayed in the foreground display area of the display unit 106 while the second user interface element 302 is displayed in a background display area of the display unit 106. The translucent version of the first user interface element 402 has a first application specific format defined by the first user interface element generator 120 of the first application 114. The translucent version of the first user interface element 402 is displayed in an inactive state and the display of the second user interface element 302 is maintained in an active state.

That is, the translucent version of the first user interface element 402 is temporarily shown as if it is in the foreground, but the user can continue typing or otherwise interacting with the second user interface element 302. After a pre-defined amount of time (e.g., five seconds), the translucent version of the first user interface element 402 disappears (e.g., gradually fades away).

In an embodiment, the translucent version of the first user interface element 402 is displayed in the same display location in display 400 as the display location of the first user interface element in display 200, thus leveraging a user's learned viewing memory and presenting a familiar user interface context. In an alternative embodiment, the translucent version of the first user interface element 402 may be displayed at a different location than the display location of the first user interface element 202 in display 200. While the entire translucent version of the first user interface element 402 is illustrated as overlaying the second user interface element 302, a portion of the translucent version of the first user interface element 402 may overlay a portion of the second user interface element 202.

In another embodiment, the translucent version of the first user interface element 402 is generated and displayed in a foreground display area of the display unit 106 in response to the receipt of content that is available for display at the electronic device 102. In other words, the user has not requested the display of the first user element interface 202 prior to requesting the display of the second user interface element 302. The second user interface element 302 is the only user interface element displayed on the display unit 106 until the translucent version of the first user interface element 402 is generated and displayed in response to the first application receiving content for display on the electronic device 102.

In an alternative embodiment, when first user interface element manager 124 receives the command to provide notification that the first application 114 has received content that is available for display, the user interface element manager 124 of the operating system 112 determines whether a second user interface element 302 is on display in a foreground display area of the display unit 106. If the user interface element manager 124 determines that a second user interface element 302 is on display in the foreground display area, the user interface element manager 124 coordinates a display of the first user interface element by replacing the opaque version of second user interface element with a translucent version of the second user interface element such that the first user interface element disposed behind the second user interface element becomes visible through the second user interface element. The translucent version of the second user interface element is temporarily maintained in a translucent state. After a pre-defined amount of time (e.g., five seconds), the translucent version of the second user interface element become opaque again.

In another embodiment, the portion of the second user interface element overlaying the first user interface element becomes translucent such that the first interface element disposed behind the second user interface element becomes visible through the second user interface element. The portion of the second user interface that does not overlay the first user interface element remains opaque.

Figure 5:
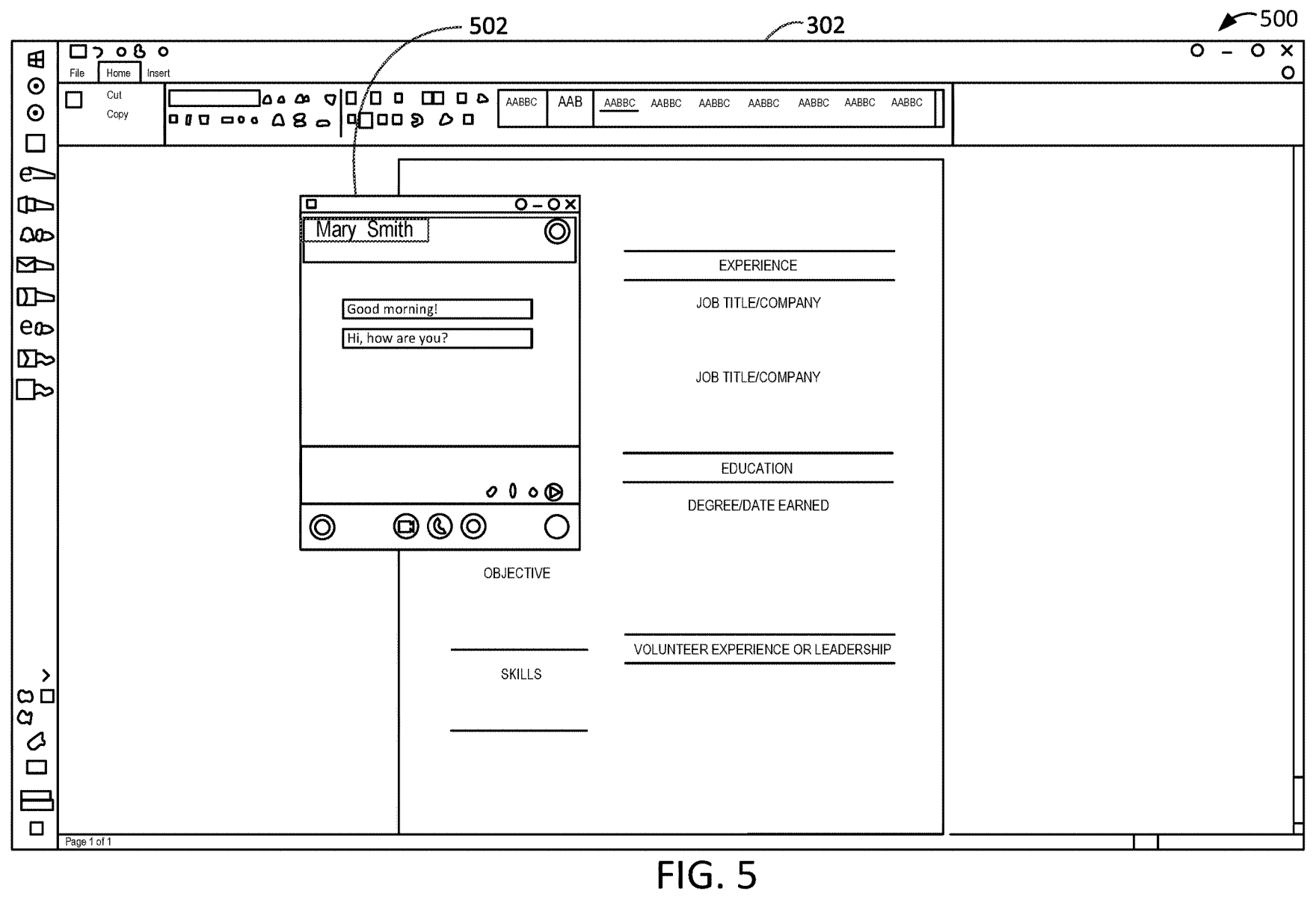

Referring to FIG. 5, a display 500 of an example of an opaque version of the first user interface element 502 overlaying the second user interface element 302 is shown. In an alternative embodiment, a full display associated with the first application may be brought to the foreground display area (not shown). The processor 104 is executing the computer readable code associated with both the first application 114 and the second application 116 on the electronic device 102.

The user interface element manager 124 determines whether user input associated with one of the translucent version of the first user interface element 402 and the second user interface element 302 is received via an input device 108, or whether the user otherwise intends to interact with the translucent version of the first user interface element 402. For example, the user input may correspond to a mouse click, mouse hover, a keyboard shortcut, eye gaze determination (e.g., the device concludes that the user is viewing the translucent version of the first user interface element 402), as further described below. The user interface element manager 124 issues a command to either remove the display of the translucent version of the first user interface element 402 from the foreground display area, or to display an opaque version of the first user interface element 502 in the foreground display area based on the determination.

The user interface element manager 124 removes the display of the translucent version of the first user interface element 402 if the user interface element manager 124 receives one or more of the following: user input via a user input device 108: the entry of data via the second user interface element 302, tracked eye movement away from the translucent version of the first user interface element 402, a swiping gesture associated with an desire to remove the translucent version of the first user interface element 402, detected head movement away from the translucent version of the first user interface element 402, user input via a button that appears in response to the detection of a cursor hovering over the translucent version of the first user interface element 402 and/or detected cursor movement away from the translucent version of the first user interface element 402. The user interface element manager 124 also removes the display of the translucent version of the first user interface element 402 following the passage of a pre-defined period without receiving any user input associated with the translucent version of the first user interface element 402.

The user interface element manager 124 displays an opaque version of the first user interface element 502 in the foreground display area at the same display location as the display location of the translucent version of the first user interface element 402 if the user interface element manager 124 receives one or more of the following: user input via a user input device 108: providing user input indicating a selection of the translucent version of the user interface element 402, tracked eye movement toward the translucent version of the first user interface element 402, detected head movement toward from the translucent version of the first user interface element 402, and/or detected cursor movement toward the translucent version of the first user interface element 402.

The user interface element manager 124 removes the display of the opaque version of the first user interface element 502 if the user interface element manager 124 receives one or more of the following: user input via a user input device 108: the entry of data via the opaque version of the first user interface element 502, tracked eye movement away from the opaque version of the first user interface element 502, a swiping gesture associated with an desire to remove the opaque version of the first user interface element 502, dismissing or minimizing the first user interface element 502, detected head movement away from the opaque version of the first user interface element 502, and/or detected cursor movement away from the opaque version of the first user interface element 502. The user interface element manager 124 also removes the display of the opaque version of the first user interface element 502 following the passage of a pre-defined period without receiving any user input via the opaque version the first user interface element 502.

In an embodiment, when the user interface element manager 124 displays the opaque version of the first user interface element 502 in the foreground display area, the application associated with the first user interface element 502 is an active state in the foreground display area. If the user wishes to switch back to the second user interface element 302 associated with the second application, the user provides a manual user input via, for example a taskbar or a keyboard entry, that the second user interface element 302 be brought back to the foreground display area. The user may also dismiss or minimize the first user interface element 502 to get back to the second user interface element 302.

Figure 6:
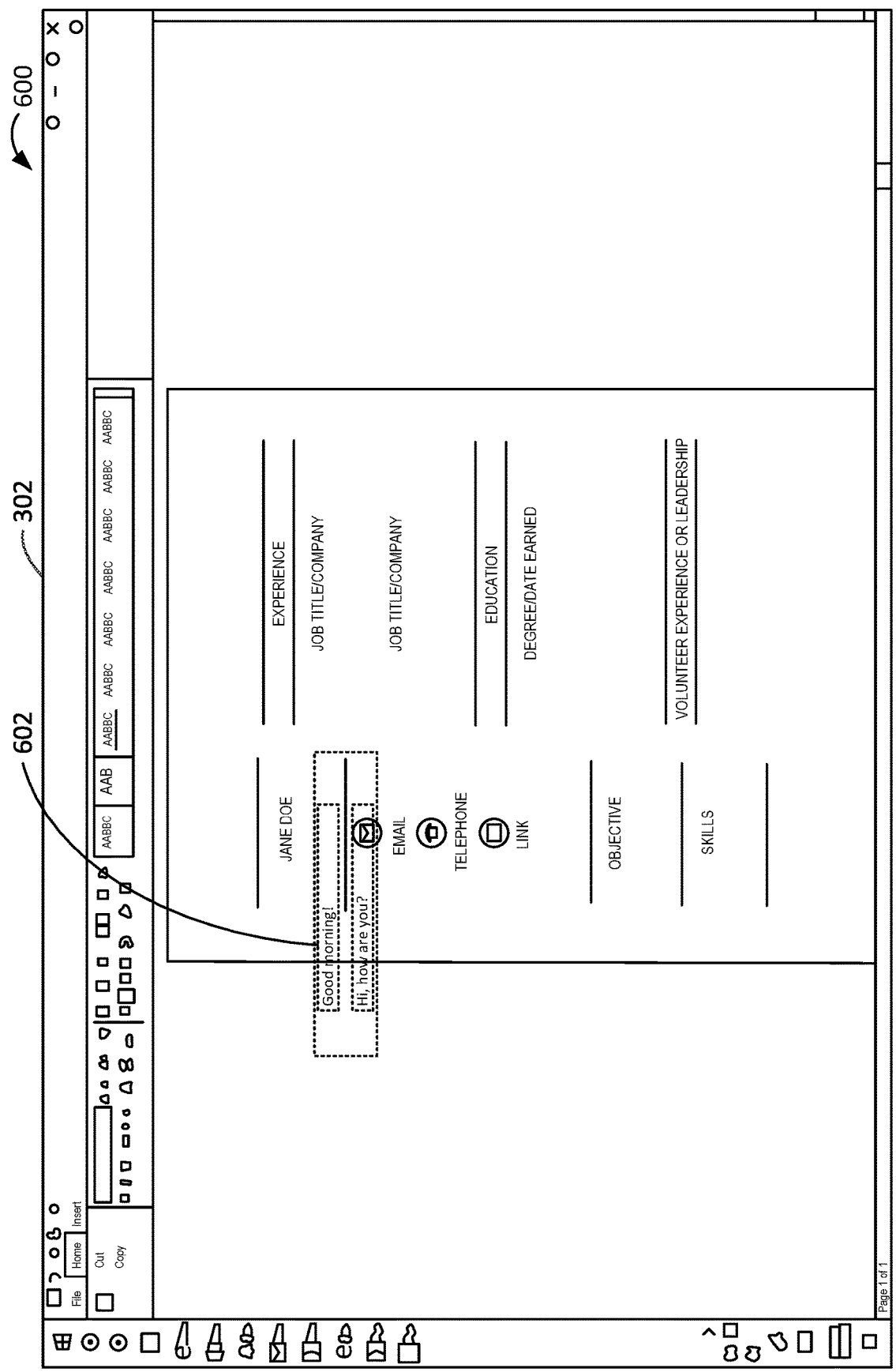
FIG. 6 illustrates a display of an example of a translucent version of a portion of the first user interface element overlaying the second user interface element.

Referring to FIG. 6, a display 600 of an example of a translucent version of a portion of the first user interface element 602 overlaying a slightly translucent version of the second user interface element is shown. FIG. 4 and FIG. 5 illustrate examples of a display of a translucent version of an entire first user interface element 402 and a display of an opaque version of an entire first user interface element 502. In an alternative embodiment, the user interface element manager 124 may issue a command to display a portion of a translucent version of the first user interface element 602 in the foreground display area of the display unit. The portion of the translucent version of the first user interface element 602 displays just the updated content received by the first application 114. The second user interface element is shown in this example to be slightly translucent.

The user interface element manager 124 determines whether user input associated with the translucent version of the portion of the first user interface element 602 is received via an input device 108. The user interface element manager 124 issues a command to display an opaque version of the first user interface element 502 in the foreground display area based on the determination. In an embodiment, the opaque version of the first user interface element that is displayed is a display of an opaque version of the entire user interface element display 502. This enables the user to enter data using the opaque version of the first user interface element 502 via a user input device 108.

Figure 7A:
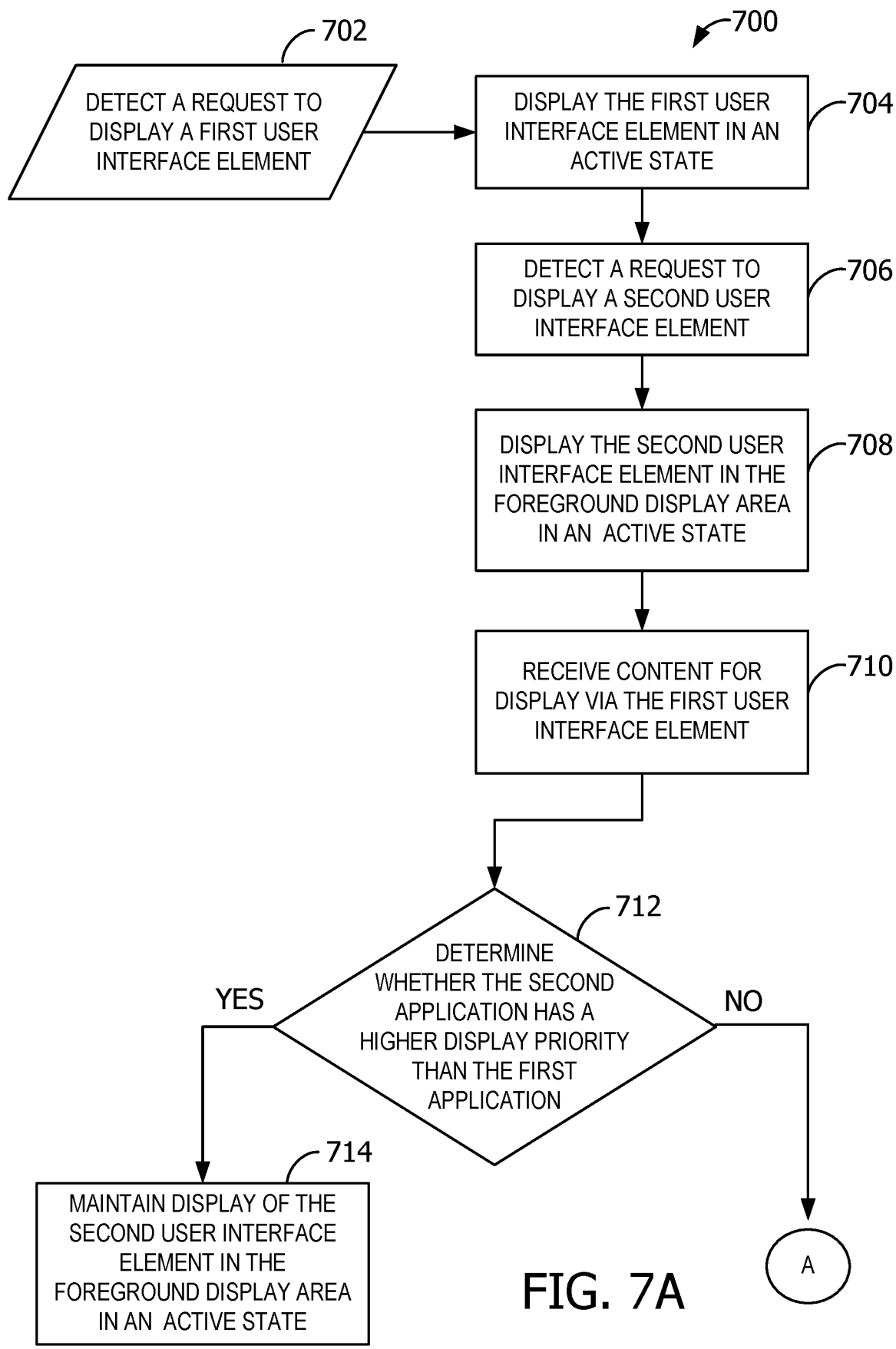

Referring to FIG. 7A-7B, a flow chart representation of an exemplary method 700 of displaying a first user interface element overlaying a second user interface element is shown. The operations illustrated in this flow chart and the other flow charts described herein may be performed by any process on a device, including a process associated with an operating system or application executing on the device.

At 702, the first user interface element generator 120 detects a request to display a first user interface element 202 from a user via a user input device 108. At 704, the first user interface element generator 120 issues a command to the display unit 106 to display the first user interface element 202 at a display location on the display unit 106 in an active state.

At 706, the second user interface element generator 126 detects a request to display a second user interface element 302 from a user via a user input device 108. At 708, the second user interface element generator 126 issues a command to the display unit 106 to display the second user interface element 302 in a foreground display area in an active state. The second user interface element 302 overlays and obscures the display of the first user interface element 202 in the background display area of the display unit 106.

At 710, the first application 114 receives content available for display via the first user interface element. In an embodiment, the received content is updated content. The notification manager 122 of the first application 114 issues a command to provide notification regarding the receipt of the content by the first application 114. The user interface element manager 124 at the operating system 112 receives the command to provide the notification. The user interface element manager 124 also receives the first application specific format associated with the first user interface element as well as the updated content received by the first application 114.

At 712, the user interface element manager 124 determines whether the display of the second user interface element 302 associated with the second application 116 has a higher display priority than the display of the first user interface element 202 associated with the first application 114. If the user interface element manager 124 determines that the second application 116 has a higher display priority than the first application 114 at 712, the user interface element manager 124 maintains the display of the second user interface element 302 in the foreground display area of the display unit in an active state at 714.

If the user interface element manager 124 determines that the second application 116 does not have a higher display priority than the first application 114 at 712, the user interface element manager 124 issues a command to display a translucent version of the first user interface element 402 with the content received by the first application 114 in the foreground display area of the display unit 106 in an inactive state at 716. The translucent version of the first user interface element 402 overlays and obscures at least a portion of the second user interface element 302.

At 718, the user interface element manager 124 determines whether to display an opaque version of the first user interface element 502 based on user input received via a user input device 108. If the user input received via the user input device 108 indicates a desire on the part of the user to remove the translucent version of the first user interface element 402, the user interface element manager 124 issues a command to the display unit 106 to remove the translucent version of the first user interface element 402 at 720. In an embodiment, if a predefined period of time passes without the user providing any input associated with the first user interface element via a user input device 108, the user interface element manager 124 issues a command to the display unit 106 to remove the translucent version of the first user interface element 402 at 720. If the user input received via the user input device 108 indicates a desire on the part of the user to interact with the first user interface element, the user interface element manager 124 issues a command to display an opaque version of the first user interface element 502 at 722.

The user interface element manager 124 detects that the user interaction with the first application 114 via the opaque version of the first user interface element 502 is complete at 724. The user interface element manager 124 issues a command to remove the opaque version of the opaque version of the first user interface element 502 at 726. Upon the removal of the opaque version of the first user interface element 502, the user interface element manager places the second user interface element 302 in an active state.

In an embodiment, when the user interface element manager 124 displays the opaque version of the first user interface element 502 in the foreground display area, the application associated with the first user interface element 502 is an active state in the foreground display area. If the user wishes to switch back to the second user interface element 302 associated with the second application, the user provides a manual user input via, for example a taskbar or a keyboard entry, that the second user interface element 302 be brought back to the foreground display area. The user may also dismiss or minimize the first user interface element 502 to get back to the second user interface element 302.

Figure 8A:
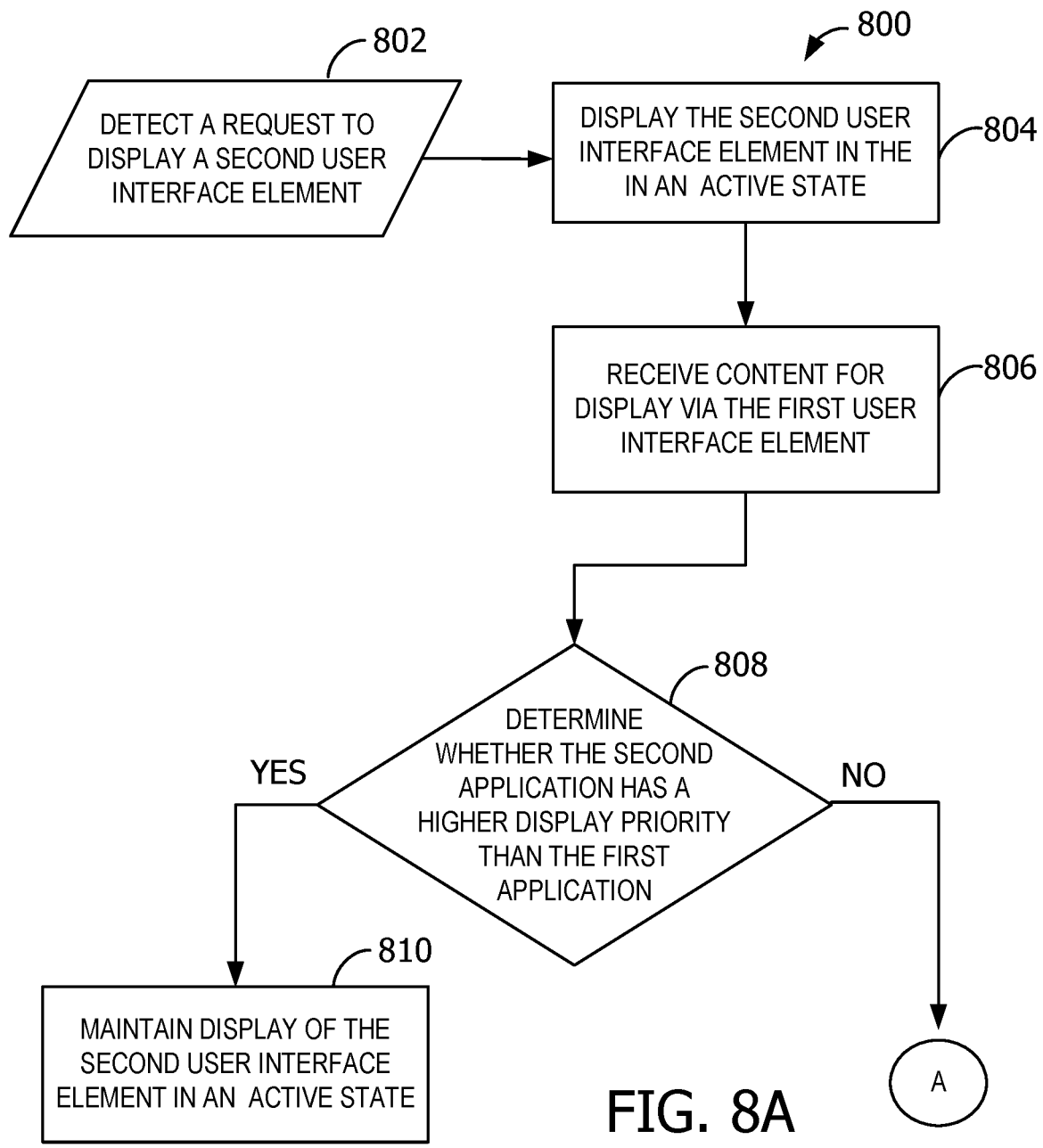
FIGS. 8A-8B illustrates a flow chart representation of another exemplary method of displaying a first user interface element overlaying a second user interface element.
Figure 8B:
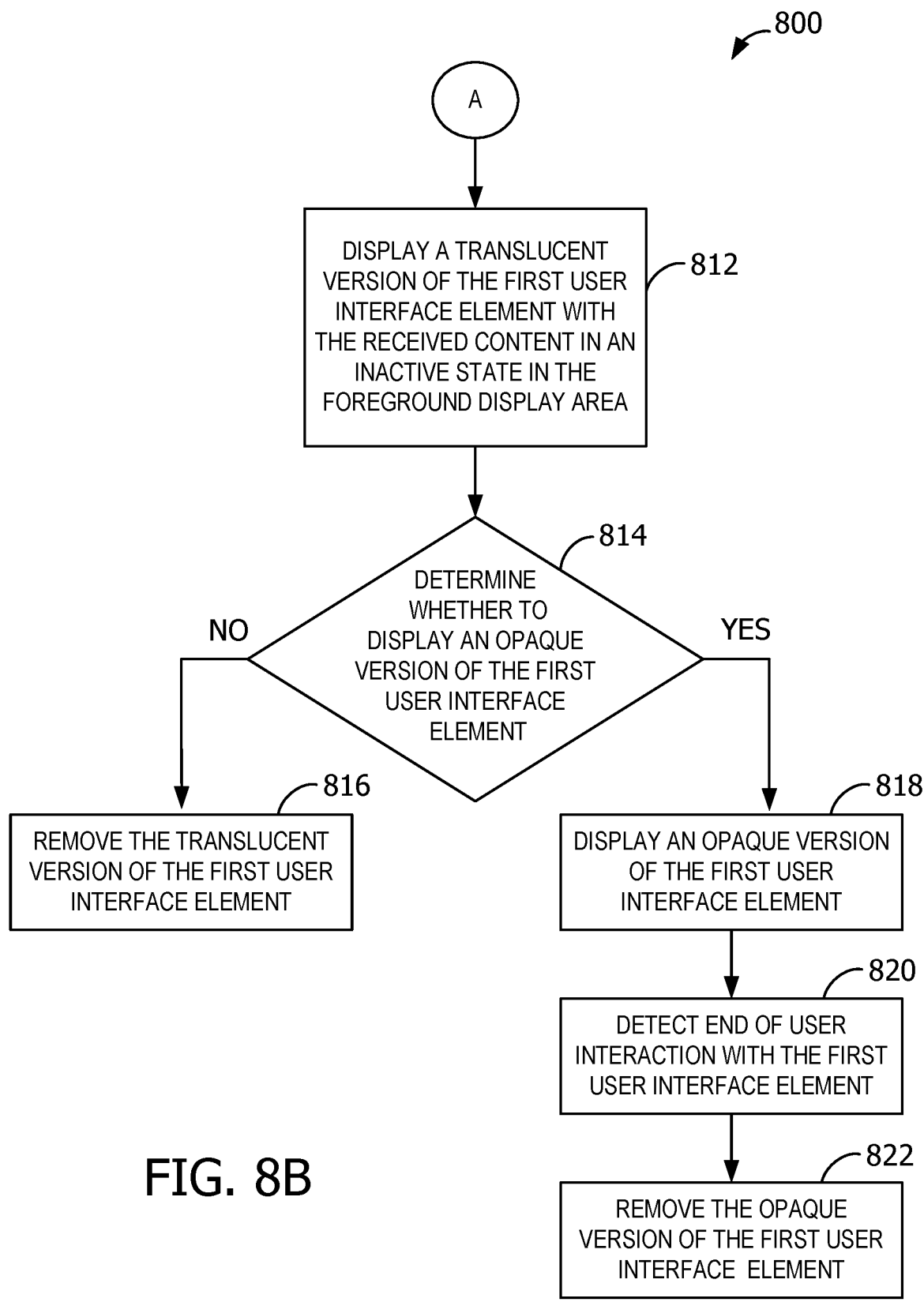

Referring to FIG. 8A-8B, a flow chart representation of an exemplary method 800 of displaying a first user interface element overlaying a second user interface element is shown. At 802, the second user interface element generator 126 detects a request to display a second user interface element 302 from a user via a user input device 108. At 804, the second user interface element generator 126 issues a command to the display unit 106 to display the second user interface element 302 in an active state.

At 806, the first application 114 receives content available for display via the first user interface element. In an embodiment, the received content is updated content. The notification manager 122 of the first application 114 issues a command to provide notification regarding the receipt of the content by the first application 114. The user interface element manager 124 at the operating system 112 receives the command to provide the notification. The user interface element manager 124 also receives the first application specific format associated with the first user interface element as well as the updated content received by the first application 114.

At 808, the user interface element manager 124 determines whether the display of the second user interface element 302 associated with the second application 116 has a higher display priority than the display of the first user interface element 202 associated with the first application 114. If the user interface element manager 124 determines that the second application 116 has a higher display priority than the first application 114 at 712, the user interface element manager 124 maintains the display of the second user interface element 302 at the display unit in an active state at 810.

If the user interface element manager 124 determines that the second application 116 does not have a higher display priority than the first application 114 at 808, the user interface element manager 124 issues a command to display a translucent version of the first user interface element 402 with the content received by the first application 114 in the foreground display area of the display unit 106 in an inactive state at 812. The translucent version of the first user interface element 402 overlays and obscures at least a portion of the second user interface element 302.

At 814, the user interface element manager 124 determines whether to display an opaque version of the first user interface element 502 based on user input received via a user input device 108. If the user input received via the user input device 108 indicates a desire on the part of the user to remove the translucent version of the first user interface element 402, the user interface element manager 124 issues a command to the display unit 106 to remove the translucent version of the first user interface element 402 at 816. In an embodiment, if a predefined period of time passes without the user providing any input associated with the first user interface element via a user input device 108, the user interface element manager 124 issues a command to the display unit 106 to remove the translucent version of the first user interface element 402 at 816. If the user input received via the user input device 108 indicates a desire on the part of the user to interact with the first user interface element, the user interface element manager 124 issues a command to display an opaque version of the first user interface element 502 at 818.

The user interface element manager 124 detects that the user interaction with the first application 114 via the opaque version of the first user interface element 502 is complete at 820. The user interface element manager 124 issues a command to remove the opaque version of the opaque version of the first user interface element 502 at 822. Upon the removal of the opaque version of the first user interface element 502, the user interface element manager places the second user interface element 302 in an active state.

Figure 9:
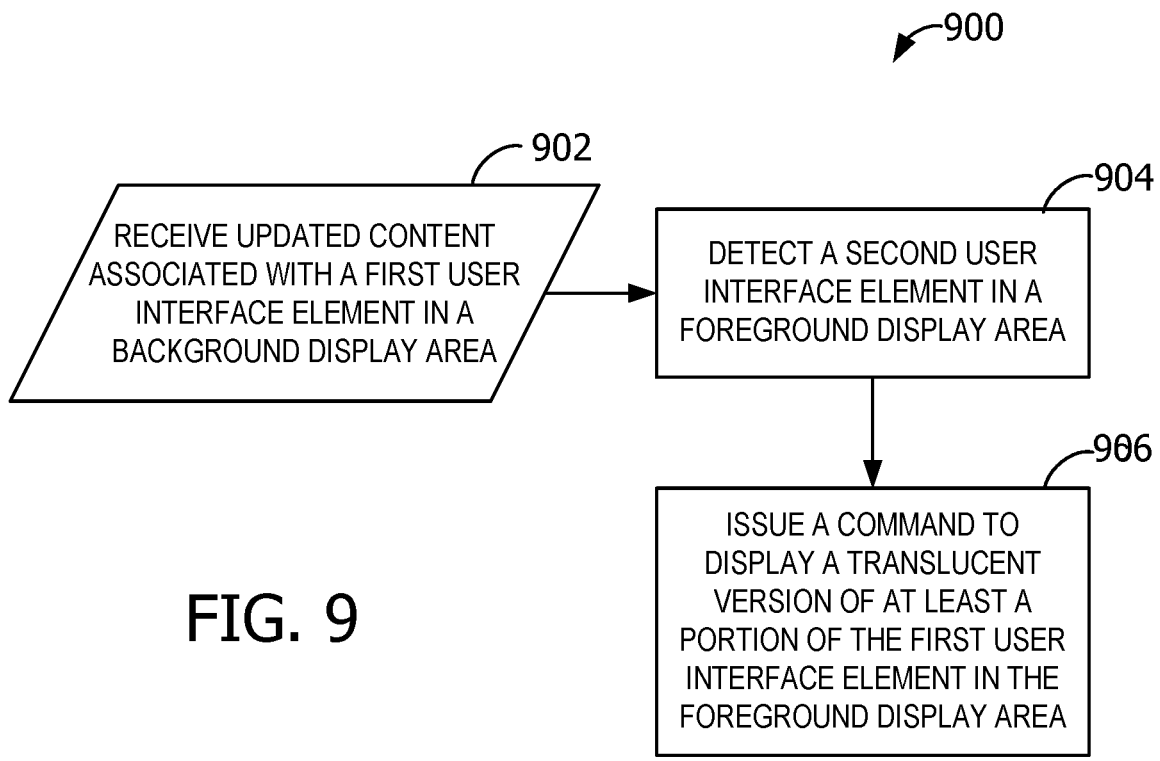
FIG. 9 illustrates a flow chart representation of another exemplary method of displaying a first user interface element overlaying a second user interface element.

Referring to FIG. 9, a flow chart representation of an exemplary method 900 of displaying a first user interface element overlaying a second user interface element is shown. At 902, the first application 114 receives updated content available for display via the first user interface element 202. The first user interface element is disposed in a background display area of the display unit 106. At 904, the operating system 112 detects a second user interface element 302 in a foreground display area of the display unit 106. The operating system 112 issues a command to display at least a portion of the translucent version of the first user interface element 602 in a foreground display area of the display unit 106 at 906.

Figure 10:
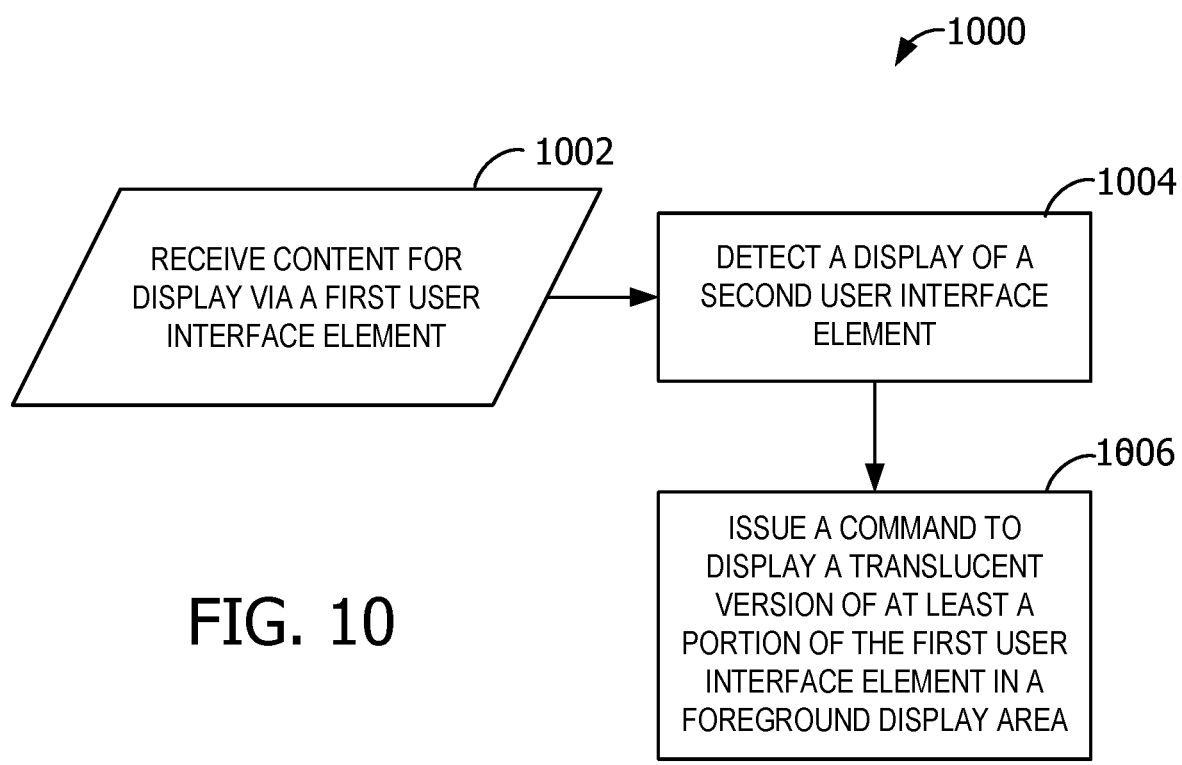
FIG. 10 illustrates a flow chart representation of another exemplary method of displaying a first user interface element overlaying a second user interface element.

Referring to FIG. 10, a flow chart representation of an exemplary method 1000 of displaying a first user interface element overlaying a second user interface element is shown. At 1002, the first application 114 receives content available for display via the first user interface element 202. At 1004, the operating system 112 detects a second user interface element 302 at the display unit 106. The operating system 112 issues a command to display at least a portion of the translucent version of the first user interface element 602 in a foreground display area of the display unit 106 at 906.

Additional Scenarios

Aspects of the disclosure are operable in numerous embodiments as described herein. Other embodiments within the scope of the disclosure include the following.

In one example, the first and second user interface elements are displayed within a virtual reality system or an augmented reality system. In this example, there is a perception of depth between these user interface elements (e.g., distance between a foreground element and a background element), while remaining in the same x-y locations as from before the updated content was received. The translucent version of the first user interface element with updated content may obscure the second user interface element until the user moves changes position. For example, as the first user interface element in the background (not the translucent version) becomes less obscured by the second user interface element in the foreground, the translucent version of the first user interface element that is in front of the second user interface element may gradually disappear at the user changes the viewing position.

In another example, the translucent version of the first user interface element is animated (e.g., the updated content may curl, pop, expand, distort, stretch, and return to normal size and shape, etc.).

In another example, sound or vibration may be used to provide a user with notice that content has been received for display at the first application.

In still another example, the content of the translucent version of the first user interface element is displayed in outline form. For example, the letters and the first user interface element are shown as outlines without fill.

In still another example, the updated content may correspond to any of the following: a message, a news feed, a stock quote, a social media posting, a weather alert, an update to a document being worked on collaboratively, an update from a personal assistant, a navigation instruction from a navigation application, a calendar appointment reminder, and/or a photo sharing update.

An application programming interface (API) is provided in some examples. The API allows the application to control how and when the translucent version of the updated content should be displayed and dismissed, for that particular application. For example, when updated content is received at an application, the application uses the API to provide the updated content for display, specifying the format to display the updated content as well as the available dismissal actions, as fields in the API function call.

Embodiments of the disclosure are not limited to transparent or translucent display of the updated content. Rather, other forms of displaying the updated content are contemplated, such as displaying the updated content in a particular color (e.g., white, black, red, or grayscale). For example, the color may be a ghosted grayscale until the user hovers a mouse input device over the updated content, at which point the updated content changes color to red or to its proper colors.

Exemplary Operating Environment

Figure 11:
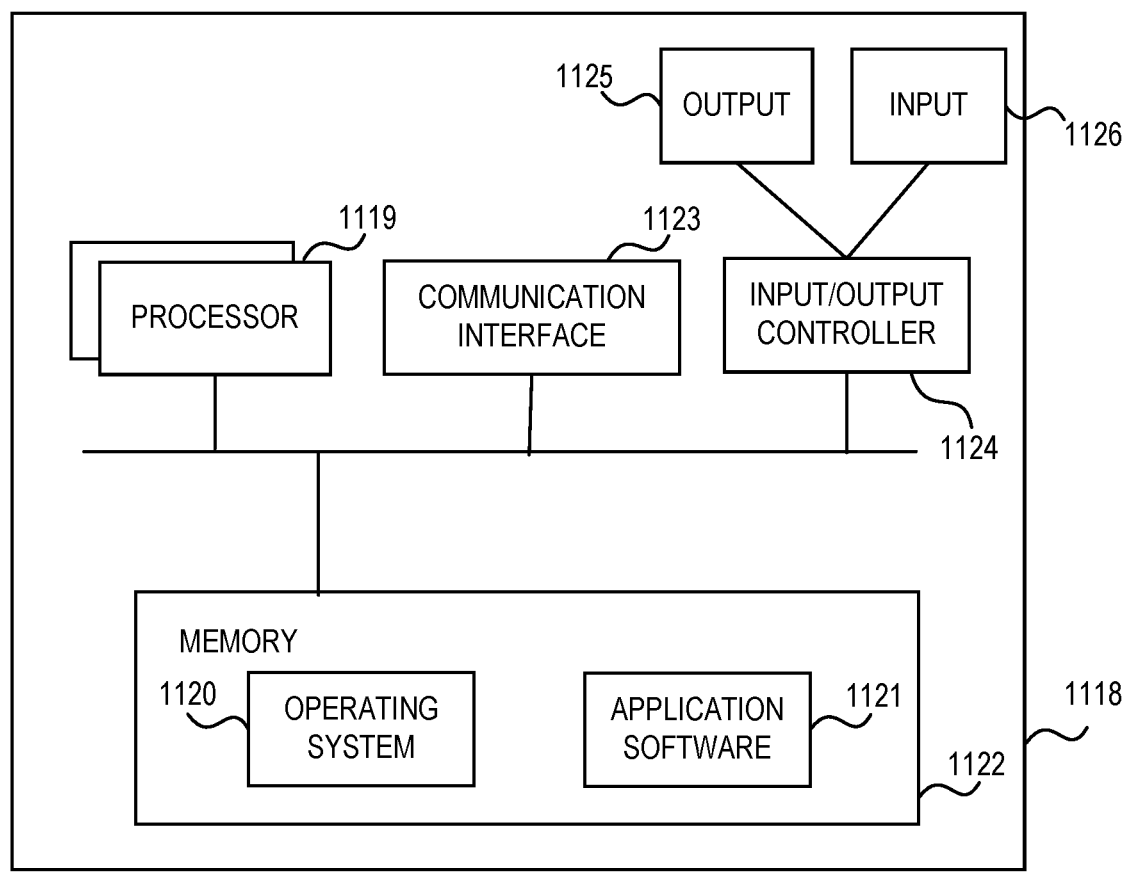
FIG. 11 illustrates a functional block diagram representation of an exemplary computer apparatus.

Referring to FIG. 11, a functional block diagram representation of an exemplary computer apparatus is shown. In an embodiment, components of a computing apparatus 1118 may be implemented as a part of an electronic device and/or computing device according to one or more embodiments described in this specification. The computing apparatus 1118 comprises one or more processors 1119 which may be microprocessors, controllers or any other suitable type of processors for processing computer executable instructions to control the operation of the electronic device. Platform software comprising an operating system 1120 or any other suitable platform software may be provided on the computing apparatus 1118 to enable application software 1121 to be executed on the device.

Computer executable instructions may be provided using any computer-readable media that are accessible by the computing apparatus 1118. Computer-readable media may include, for example, computer storage media such as a memory 1122 and communications media. Computer storage media, such as a memory 1122, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus 1118. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1122) is shown within the computing apparatus 1118, it will be appreciated by a person skilled in the art, that the storage may be distributed or located remotely and accessed via a network or other communication link (e.g. using a communication interface 1123).

The computing apparatus 1118 may comprise an input/output controller 1124 configured to output information to one or more output devices 1125, for example a display or a speaker, which may be separate from or integral to the electronic device. The input/output controller 1124 may also be configured to receive and process an input from one or more input devices 1126, for example, a keyboard, a microphone or a touchpad. In one embodiment, the output device 1125 may also act as the input device. An example of such a device may be a touch sensitive display. The input/output controller 1124 may also output data to devices other than the output device 1125, e.g. a locally connected printing device.

The functionality described herein can be performed, at least in part, by one or more hardware logic components. According to an embodiment, the computing apparatus 1118 is configured by the program code when executed by the processor 1119 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, embedded devices, etc.

Alternatively, or in addition to the other examples described herein, examples include any combination of the following:

An electronic device comprising:
  at least one processor configured to be communicatively coupled to a display unit and at least one user input device; and
  at least one memory comprising computer program code, the at least one memory and the computer program code configured to, with the at least one processor, cause the electronic device to:
    receive updated content associated with a first user interface element, the first user interface element being in a background display area of the display unit;
    detect a second user interface element in a foreground display area of the display unit; and
    issue a command to display a translucent version of at least a portion of the first user interface element including the received updated content in the foreground display area of the display unit, wherein the translucent version of the first user interface element obscures at least a portion of the second user interface element.

The electronic device described above, wherein the translucent version of the at least a portion of the first user interface element has a format defined by a first application associated with the first user interface element.

The electronic device described above, wherein the first user interface element is displayed at a display location in the background display area and the translucent version of the first user interface element is displayed at the display location in the foreground display area.

The electronic device described above, wherein the at least one processor further causes the electronic device to maintain the second user interface element in an active state while the translucent version of the at least a portion of the first user interface element is displayed in the foreground display area.

The electronic device described above, wherein the at least one processor further causes the electronic device to issue a command to display a translucent version of at least a portion of the first user interface element in an inactive state.

The electronic device described above, wherein the at least one processor further causes the electronic device to:
  determine whether user input associated with one of the translucent version of the first user interface element and the second user interface element has been received via the user input device; and
  issue a command to one of remove the display of the translucent version of the at least a portion of the first user interface element from the foreground display area, and display a relatively less translucent version of the at least a portion of the first user interface element in the foreground display area based on the determination.

The electronic device described above, wherein the user input associated with the one of the translucent version of the first user interface element and the second user interface element comprises one or more of the following: data entry via the second user interface element, eye movement associated with one of the translucent version of the first user interface element and the second user interface element, a gesture associated with the translucent version of the first user interface element, head movement associated with one of the translucent version of the first user interface element and the second user interface element, cursor movement associated with one of the translucent version of the first user interface element and the second user interface element, and passage of a pre-defined period of time without receiving user input associated with the translucent version of the first user interface element.

The electronic device described above, wherein the at least one processor further causes the electronic device to:
  issue a command to place the relatively less translucent version of the first user interface element in an active state; and
  issue a command to place the second user interface element in an inactive state.

The electronic device described above, wherein the at least one processor further causes the electronic device to:
  determine whether user input associated with one of the relatively less translucent version of the first user interface element and the second user interface element has been received via the user input device; and
  issue a command to remove the display of the relatively less translucent version of the at least a portion of the first user interface element from the foreground display area based on the determination.

The electronic device described above, wherein the at least one processor further causes the electronic device to:
  determine whether a second application associated with the second user interface element has a relatively higher display priority than a first application associated with the first user interface element; and
  issue a command to inhibit the display of the translucent version of the at least a portion of the first user interface element in the foreground display area based on the determination.

The electronic device described above, further comprising an operating system executing on the electronic device wherein the at least one processor causes the operating system to:
  receive a command from a first application associated with the first user interface element to display a notification message associated with the receipt of the updated content at the first application; and
  manage the display of the translucent version of the at least a portion of the first user interface element including the updated content in the foreground display area in a first application specific format.

The electronic device described above, further comprising an operating system executing on the electronic device wherein the at least one processor causes the operating system to:
  intercept transmission of a command from a first application associated with the first user interface element to a toast application to display a notification message associated with the receipt of the updated content at the first application; and
  manage the display of the translucent version of the at least a portion of the first user interface element including the updated content in the foreground display area in a first application specific format.

The electronic device described above, wherein the first user interface element is associated with one or more of the following applications: an instant messaging application, a chat messaging application, a text messaging application, email messaging, a video communication application, a social media based communication application, a web site based communication application, a collaboration based communication application, a photo sharing application, a calendar appointment based communication application, a weather alert application, a virtual assistant communication application, and an intelligent assistant communication application.

A computerized method comprising:
  receiving content for display via a first user interface element at a display unit;

detecting a display of a second user interface element at the display unit; and issuing a command to display a translucent version of at least a portion of the first user interface element including the received content in a foreground display area of the display unit, wherein the translucent version of the at least a portion of the first user interface element obscures at least a portion of the second user interface element.

The computerized method described above, wherein the translucent version of the at least a portion of the first user interface element has a format defined by a first application associated with the first user interface element and the computerized method further comprises:

maintaining the second user interface element in an active state while the translucent version of the at least a portion of the first user interface element is displayed in the foreground display area; and issuing a command to display the translucent version of the at least a portion of the first user interface element in an inactive state.

The computerized method described above, further comprising:

determining whether user input associated with one of the translucent version of the first user interface element and the second user interface element has been received via a user input device; and issuing a command to one of remove the display of the translucent version of the at least a portion of the first user interface element from the foreground display area, and display a relatively less translucent version of the at least a portion of the first user interface element in the foreground display area based on the determination.

The computerized method described above further comprising:

determining whether user input associated with one of the relatively less translucent version of the first user interface element and the second user interface element has been received via the user input device; and issuing a command to remove the display of the relatively less translucent version of the at least a portion of the first user interface element from the foreground display area based on the determination.

One or more computer storage media having computer-executable instructions that, upon execution by a processor, cause the processor to:

receive content for display via a first user interface element associated with a first application, the first user interface element being in a background display area of a display unit and having an application specific format defined by the first application;

detect a second user interface element associated with a second application in a foreground display area of the display unit; and issue a command to display a translucent version of at least a portion of the first user interface element in the foreground display area of the display unit, wherein the translucent version of the first user interface element obscures at least a portion of the second user interface element and has the first application specific format.

The one or more computer storage media described above, wherein the computer-executable instructions further cause the processor to:

display the first user interface element at a display location in the background display area; and display the translucent version of the first user interface at the display location in the foreground display area.

The one or more computer storage media described above, wherein the computer-executable instructions further cause the processor to:

maintain the second user interface element in an active state while the translucent version of the at least a portion of the first user interface element is displayed in the foreground display area; and display the translucent version of the at least a portion of the first user interface element in the foreground display area an inactive state.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An electronic device comprising:
   at least one processor configured to be communicatively coupled to a display unit and at least one user input device; and
   at least one memory comprising computer program code, the at least one memory and the computer program code configured to, with the at least one processor, cause the electronic device to:
   receive updated content for display in a first user interface element, the first user interface element being in a background display area of the display unit;
   detect a second user interface element in a foreground display area of the display unit;
   based on the received updated content, move the first user interface element to the foreground display area of the display unit;
   issue a command to display a translucent version of at least a portion of the first user interface element including the received updated content in the foreground display area of the display unit, wherein the translucent version of the at least the portion of the first user interface element obscures at least a portion of the second user interface element; and
   while the translucent version of the at least the portion of the first user interface element is displayed in the foreground display area, enable a user to interact with the second user interface element displayed in the background display area.

2. The electronic device of claim 1, wherein a second portion of the first user interface element that does not obscure the second user interface element is not transparent.

3. The electronic device of claim 1, wherein the first user interface element is displayed at a display location in the background display area and the translucent version of the at least the portion of the first user interface element is displayed at the display location in the foreground display area.

4. The electronic device of claim 1, wherein the at least one processor further causes the electronic device to maintain the second user interface element in an active state while the translucent version of the at least the portion of the first user interface element is displayed in the foreground display area.

5. The electronic device of claim 1, wherein the at least one processor further causes the electronic device to issue a command to display the translucent version of the at least the portion of the first user interface element in an inactive state.

6. The electronic device of claim 1, wherein the at least one processor further causes the electronic device to:
   determine whether user input associated with one of the translucent version of the first user interface element and the second user interface element has been received via the user input device; and
   issue a command to:
   remove the display of the translucent version of the at least the portion of the first user interface element from the foreground display area, or
   display a relatively less translucent version of the at least the portion of the first user interface element in the foreground display area based on the determination.

7. The electronic device of claim 6, wherein the user input associated with the one of the translucent version of the first user interface element and the second user interface element comprises one or more of the following: data entry via the second user interface element, eye movement associated with one of the translucent version of the first user interface element and the second user interface element, a gesture associated with the translucent version of the first user interface element, head movement associated with one of the translucent version of the first user interface element and the second user interface element, cursor movement associated with one of the translucent version of the first user interface element and the second user interface element, a keyboard shortcut, and passage of a pre-defined period of time without receiving user input associated with the translucent version of the first user interface element.

8. The electronic device of claim 6, wherein the at least one processor further causes the electronic device to:
   issue a command to place the relatively less translucent version of the first user interface element in an active state; and
   issue a command to place the second user interface element in an inactive state.

9. The electronic device of claim 6, wherein the at least one processor further causes the electronic device to:
   determine whether user input associated with one of the relatively less translucent version of the first user interface element and the second user interface element has been received via the user input device; and
   issue a command to remove the display of the relatively less translucent version of the at least the portion of the first user interface element from the foreground display area based on the determination.

10. The electronic device of claim 1, wherein the at least one processor further causes the electronic device to:
    determine whether a second application associated with the second user interface element has a relatively higher display priority than a first application associated with the first user interface element; and
    issue a command to inhibit the display of the translucent version of the at least the portion of the first user interface element in the foreground display area based on the determination.

11. The electronic device of claim 1, further comprising an operating system executing on the electronic device wherein the at least one processor causes the operating system to:
    receive a command from a first application associated with the first user interface element to display a notification message associated with the receipt of the updated content at the first application; and
    manage the display of the translucent version of the at least the portion of the first user interface element including the updated content in the foreground display area in a first application specific format.

12. The electronic device of claim 1, further comprising an operating system executing on the electronic device wherein the at least one processor causes the operating system to:
    intercept transmission of a command from a first application associated with the first user interface element to a toast application to display a notification message associated with the receipt of the updated content at the first application; and
    manage the display of the translucent version of the at least the portion of the first user interface element including the updated content in the foreground display area in a first application specific format.

13. The electronic device of claim 1, wherein the first user interface element is associated with one or more of the following applications: an instant messaging application, a chat messaging application, a text messaging application, email messaging, a video communication application, a social media based communication application, a web site based communication application, a collaboration based communication application, a photo sharing application, a calendar appointment based communication application, a weather alert application, a virtual assistant communication application, and an intelligent assistant communication application.

14. A computerized method comprising:
   receiving content for display via a first user interface element at a display unit, the first user interface element being in a background display area of the display unit;
   detecting a display of a second user interface element at the display unit, the second user interface element being in a foreground display area of the display unit;
   based on the received updated content, moving the first user interface element to the foreground of the display area of the display unit;
   issuing a command to display a translucent version of at least a portion of the first user interface element including the received content in the foreground display area of the display unit, wherein the translucent version of the at least the portion of the first user interface element obscures at least a portion of the second user interface element; and
   while the translucent version of the at least the portion of the first user interface element is displayed in the foreground display area, enable a user to interact with the second user interface element displayed in the background display area.

15. The computerized method of claim 14, wherein the translucent version of the at least the portion of the first user interface element has a format defined by a first application associated with the first user interface element and the computerized method further comprises:
   maintaining the second user interface element in an active state while the translucent version of the at least the portion of the first user interface element is displayed in the foreground display area; and
   issuing a command to display the translucent version of the at least the portion of the first user interface element in an inactive state.

16. The computerized method of claim 14, further comprising:
   determining whether user input associated with one of the translucent version of the first user interface element and the second user interface element has been received via a user input device; and
   issuing a command to:
      remove the display of the translucent version of the at least the portion of the first user interface element from the foreground display area, or
      display a relatively less translucent version of the at least the portion of the first user interface element in the foreground display area based on the determination.

17. The computerized method of claim 16, further comprising:
   determining whether user input associated with one of the relatively less translucent version of the first user interface element and the second user interface element has been received via the user input device; and
   issuing a command to remove the display of the relatively less translucent version of the at least the portion of the first user interface element from the foreground display area based on the determination.

18. One or more computer storage media having computer-executable instructions that, upon execution by a processor, causes the processor to:
   receive content for display via a first user interface element associated with a first application, the first user interface element being in a background display area of a display unit and having an application specific format defined by the first application;
   detect a second user interface element associated with a second application in a foreground display area of the display unit;
   based on the received updated content, move the first user interface element to the foreground display area of the display unit;
   issue a command to display a translucent version of at least a portion of the first user interface element in the foreground display area of the display unit, wherein the translucent version of the at least the portion of the first user interface element obscures at least a portion of the second user interface element and has the application specific format; and
   while the translucent version of the at least the portion of the first user interface element is displayed in the foreground display area, enable a user to interact with the second user interface element displayed in the background display area.

19. The one or more computer storage media of claim 18, wherein the computer-executable instructions further cause the processor to:
   display the first user interface element at a display location in the background display area; and
   display the translucent version of the at least the portion of the first user interface at the display location in the foreground display area.

20. The one or more computer storage media of claim 18, wherein the computer-executable instructions further cause the processor to:
   maintain the second user interface element in an active state while the translucent version of the at least the portion of the first user interface element is displayed in the foreground display area; and
   display the translucent version of the at least the portion of the first user interface element in the foreground display area an inactive state.

* * * * *